UNITED STATES PATENT OFFICE.

ROBERT MACPHERSON, OF BRONDESBURY, AND WILLIAM EDWIN HEYS, OF BUSHEY, ENGLAND.

MANUFACTURE OF DETERSIVE AGENTS.

1,027,744.　　　Specification of Letters Patent.　　Patented May 28, 1912.

No Drawing.　　Application filed December 27, 1909.　Serial No. 534,937.

*To all whom it may concern:*

Be it known that we, ROBERT MACPHERSON, a resident of Brondesbury, in the county of Middlesex, England, and WILLIAM EDWIN HEYS, a resident of Bushey, in the county of Hertford, England, both subjects of the King of Great Britain and Ireland, have invented new Improvements in the Manufacture of Detersive Agents, of which the following is a specification.

It is already known in the manufacture of normal soap and of soap powders, to treat at a temperature of about 80° or 90° C., protein containing matters with a sufficiency of lye containing as a maximum about 35 per cent. sodium hydroxid to effect the dissociation of the proteins and the saponification of the amino-fatty acids arising therefrom. This process results in a loss of a considerable part of the available nitrogen in evolved ammonia with other volatile compounds, and in the production of articles having an unpleasant odor and unattractive color. It is also known to manufacture soap by a so-called "cold" process which nevertheless involves the application of external heat. It has also been known to manufacture soap by acting on a finely divided protein containing substance with caustic lye in the presence of added olein. In such a process the caustic selectively reacts with the olein and only to a much less extent with the protein containing substance, and a properly soluble mass is not obtained, as much of the protein matter is unchanged.

In carrying this present invention into effect the caustic lye is caused to first act upon finely divided vegetable material, *e. g.*, protein or protein and starch containing substance without any or substantially any addition of olein, fats, oils, glycerids, fatty acids or the like. By this treatment the vegetable material, *e. g.*, protein or protein and starch containing substance is converted into an alkaline compound which is quite soluble and may be itself used as a soap powder or may have acids or the like for the production of a "bar" or "tablet" soap or like detersive agent. Such an alkaline compound we will hereinafter term "alkalinated vegetable material."

In our improved process no application of external heat is required and the loss of nitrogen which has hitherto taken place in the production of soap from protein containing substance is very considerably reduced and products having attractive colors are obtained.

In carrying out this invention we employ any suitable mixing machine, but because of its grinding action, we prefer to use an edge runner mill, and preferably that type known as a chocolate mill or mélangeur. The vegetable materials, *e. g.*, protein, or protein and starch containing substances which may be employed are so numerous that we can name only a few typical ones which are generally and commercially available. For example, oatmeal, maize meal, and meal of other cereals, and of the various kinds of beans and peas and other seeds, the germ separated from cereals and other seeds, various "oil cakes," casein, gluten and other dry albuminous matters. For commercial reasons, we commonly employ maize-germ meal. When a selected protein or protein and starch containing substance contains much protein, it is difficult to handle because of its agglutinating property but it can nevertheless be used with considerable trouble. A result almost equally good, and having a better appearance, is produced very much more quickly and easily, if a relatively large proportion of starch or farina be present or added. Starches have already been added to soaps, as "fillers," and may be detected unaltered in the so adulterated soaps. But, by this process the starch is caused to permanently combine with the alkali, and so to form a valuable soda carrier, and very little trace of starch can be detected as such, in the products. The proportion of starch which may be contained or added may vary according to the nature of the product demanded, from 10 to 90 per cent. of the whole. Usually, we employ a flour or meal containing about 25 per cent. of proteins, in a state of very fine division or as flour.

The soda or potash lye must be highly concentrated and the higher the degree of concentration the better. Lyes are commonly available which contain respectively 42 per cent. of sodium hydroxid, (S. G. 1.47) or 50 per cent. of potassium hydroxid (S. G. 1.50) and for this reason we use these strengths. In the example hereinafter given, such lyes are supposed to be employed, and lyes of the high concentration indicated are meant by the reference herein to highly concentrated lye. With lyes of this high concentration, according to our process, not only the proteins, but also the starches and the cellulose matters are converted into permanent sodium (or potassium) compounds, and thus form strongly detersive and highly useful agents instead of being useless adulterants as heretofore.

The dry, finely powdered vegetable matter, e. g., meal or flour, and the concentrated lye are introduced into the mixing machine and mixed thoroughly until the vegetable material is permanently chemically combined with alkali, which operation should occupy only two or three minutes.

If a detersive powder be required, the alkalinated vegetable material or product is then removed from the mixer and spread out to dry and for the free alkali to carbonate.

If a hard "bar" or "tablet" soap or detersive agent be required, the alkalinated vegetable material need not be removed from the machine, but the necessary fatty acids and water and any portion of the required highly concentrated lye which may not have been added in the first stage of the process are added thereto and the mixing is continued for from 30 to 40 minutes. The plastic soap or detersive agent can then be removed from the mixer, and when sufficiently cold, can be milled and plodded in the usual way, or the milling may be omitted. Bars can thus be produced within two hours from commencing the operation, as against the 14 days required in the ordinary manufacture of similar soaps by the ordinary boiling process. A considerable rise of temperature occurs during admixture of the vegetable material and lye and there is an additional increment of heat caused by the addition of the fatty acids, so that no applied heat whatever is necessary and all the materials are used at atmospheric temperatures or thereabout.

Fatty acids are specified for the reason that if the ordinary oils and fats were employed, the glycerin could not conveniently be separated from the soap, because the alkalinated vegetable materials, e. g., protein, starch and cellulose compounds are soluble in lyes and brine and would go out with the glycerin. If glycerids are required to be used in substitution for the whole or part of the fatty acids, the glycerin will be retained in the soap or detersive agent, and less water should be used. Soap or detersive agent thus made with glycerids, will require a longer time to mature. Because of the high solubility of the alkalinated vegetable materials, e. g., protein, starch, and cellulose compounds in salt and hard waters, our new detersive agents are especially adapted for use in such waters.

If a soft soap be required, highly concentrated potash lye or a mixed highly concentrated lye is used and more water is added.

It will be understood that for hard soaps or detersive agents, highly concentrated soda lye is employed.

By way of example, the process we employ in the production of a hard household soap is as follows: 25 kilos of maize germ flour and 24 kilos of the concentrated soda lye containing about 42 per cent. of sodium hydroxid are thoroughly mixed until a pasty mass is produced in which about 3.85 kilos of the NaHO has permanently combined with the germ flour. The length of time taken to effect such combination varies according to the efficiency of the mixer employed but with an edge runner mill the time will only be two to four minutes. No water should be added during this part of the operation otherwise volatile nitrogen products will be separated. When the chemical combination of the NaHO and flour has taken place, the excess alkali is exactly neutralized by the addition to and intimate mixing with the pasty mass of 17 kilos of commercial oleic acid and 21 kilos of cocoa nut olein or fatty acid. But a mass of soap so produced is too hard to be properly worked and to produce a workable mass which can be plodded in the usual way for the formation of bars we add 31 kilos of water. The duration of this second mixing for soap production may, in an edge runner mill, be from 18 to 35 minutes. If the complete process is carried out in the same mixer the time occupied from the commencement of the operation to the production of soap will be from 20 to 40 minutes.

If a detergent powder be desired the pasty mass produced by the treatment of the flour with the concentrated lye may be exposed to the air until the excess of alkali be carbonated thereby, and then be ground. Or, instead of employing 24 kilos of the soda lye 10 kilos only may be employed, in which case the subsequent carbonation is not required.

What we claim and desire to secure by Letters Patent is:—

1. The process of producing a mass of a chemically combined alkali compound of finely divided protein containing substance by treating that substance with highly concentrated lye without the application of heat and substantially without the addition thereto of oils, fats or fatty acids, or water, as herein set forth.

2. The process of producing a detersive agent which consists in over-alkalinating finely divided protein containing substance by means of highly concentrated lye substantially without the addition of water, oils, fats or fatty acids and without the application of heat and subsequently adding to the over-alkalinated compounds so produced sufficient oils, fats or fatty acids to combine with the excess of alkali substantially without splitting the said alkali compound, and any desired water, as herein set forth.

3. Protein matter chemically combined with alkali and which has been produced in a mass by treating finely divided protein containing substance with highly concentrated lye without the application of heat and substantially without the addition thereto of oils, fats or fatty acid or water, as herein set forth.

4. A detersive agent which has been produced by over alkalinating finely divided protein containing substance by means of highly concentrated lye substantially without the addition of water, oils, fats or fatty acids and without the application of heat and in then adding to the compound of protein matter and alkali thus produced sufficient oils, fats or fatty acids to combine with the excess of alkali substantially without splitting the said alkali protein compound, and any desired water, as herein set forth.

5. A detersive agent which has been produced by over-alkalinating finely divided vegetable material by means of highly concentrated lye substantially without the addition of water, oils, fats, or fatty acids and substantially without the application of heat, and in then adding to such alkalinated vegetable material sufficient oils, fats, or fatty acids to combine with the excess of alkali substantially without splitting the said alkalinated vegetable material, and any desired water as herein set forth.

In witness whereof we have hereunto set our hands in the presence of two subscribing witnesses.

ROBERT MACPHERSON.
WILLIAM EDWIN HEYS.

Witnesses:
  WALTER ALBERT GREEN,
  ARTHUR CARRICK.